(12) United States Patent
Bolotov et al.

(10) Patent No.: US 7,890,565 B2
(45) Date of Patent: Feb. 15, 2011

(54) EFFICIENT HARDWARE IMPLEMENTATION OF TWEAKABLE BLOCK CIPHER

(75) Inventors: Anatoli Bolotov, Cupertino, CA (US); Mikhail I. Grinchuk, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 960 days.

(21) Appl. No.: 11/741,865

(22) Filed: Apr. 30, 2007

(65) Prior Publication Data

US 2008/0270505 A1 Oct. 30, 2008

(51) Int. Cl.
*G06F 7/72* (2006.01)
(52) U.S. Cl. ..................................... 708/492
(58) Field of Classification Search ........................ None
See application file for complete search history.

(56) References Cited

U.S. PATENT DOCUMENTS

| | | | |
|---|---|---|---|
| 2003/0103626 A1* | 6/2003 | Stein et al. ..................... 380/42 |
| 2003/0133568 A1* | 7/2003 | Stein et al. ..................... 380/37 |
| 2006/0050873 A1* | 3/2006 | Matsui et al. ................. 380/37 |
| 2009/0006517 A1* | 1/2009 | Gopal et al. ................ 708/492 |
| 2009/0204859 A1* | 8/2009 | Cousins ....................... 714/701 |

OTHER PUBLICATIONS

"Draft Standard Architecture for Encrypted Shared Storage Media," IEEE P1619 D5, Mar. 23, 2006.

* cited by examiner

*Primary Examiner*—David H Malzahn
(74) *Attorney, Agent, or Firm*—Luedeka, Neely & Graham, P.C.

(57) ABSTRACT

A combination of an infrequently-called tiny multiplication unit and a "differential" unit that quickly computes $T \otimes (n+1)$ basing on known $T \otimes n$. The schedule (how often the multiplication unit is called) can be considered as a parameter of the algorithm. The proposed architecture of the "differential" unit is efficient both in terms of speed (delay) and area (gate count).

15 Claims, 9 Drawing Sheets

EFFICIENT HARDWARE IMPLEMENTATION OF TWEAKABLE BLOCK CIPHER

FIELD

This invention relates to the field of data storage. More particularly, this invention relates to maintaining the security of data at rest.

BACKGROUND

"Data at rest" is the name that is commonly used for stored data, such as that residing on large hard drive or tape drive systems. Data at rest describes such data as it is disposed, for example, in large scale commercial data storage systems, such as might be used for credit card data and medical records. The security of data at rest is becoming an increasingly important topic as vast amounts of an individual's sensitive information are digitized and stored.

Several different methods and standards for protecting the confidentiality of such data have been developed and utilized. The Institute of Electrical and Electronics Engineers, Inc. has organized an effort to develop additional security measures for data at rest. This project is refining an advanced encryption standard that was originally developed by Liskov, Rivest, and Wagner, and is variously referred to as LRW-AES, AES-LRW, P1619, or tweakable narrow block encryption.

Such methods are developed to prevent malicious and unauthorized access to data, such as copy-and-paste attacks and dictionary attacks. These methods are based on standard AES, where both input and output of an AES encryptor/decryptor are XORed with vectors computed from a tweakable key and a data block's serial number (so-called whitening vectors). Compact and fast computation of whitening vectors is critical for numerous applications.

Figure 1:
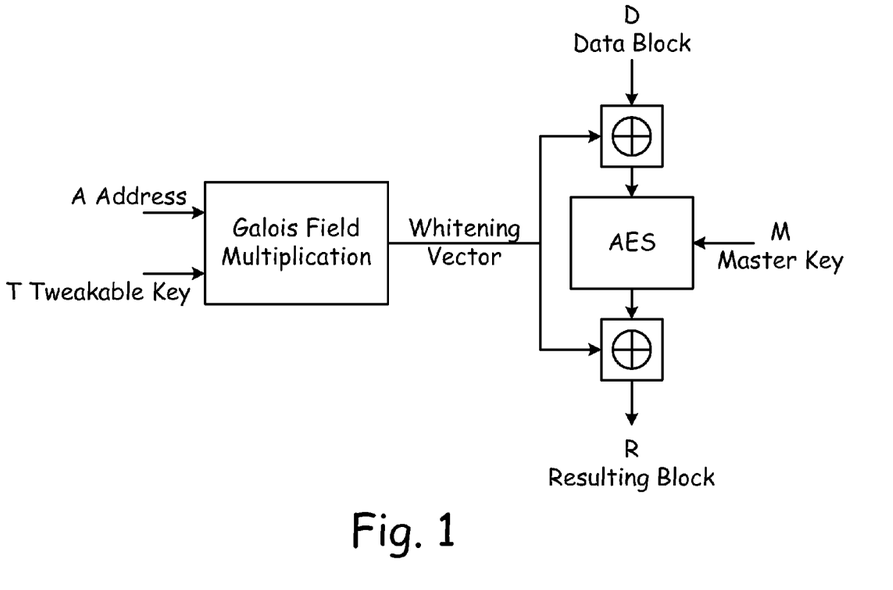
FIG. 1 depicts a functional block diagram of a general scheme of LRW-AES, where the address and tweakable key are multiplied in the Galois field $GF(2^{128})$ to produce the whitening vector which is XORed on both the inputs and the outputs of the AES unit.

Let M and T be a so-called master key (128, 192, or 256 bits, depending on the implementation) and a tweakable key (128 bits) respectively, let D be a 128-bit data block, and let n be its serial number (address), also represented as a 128-bit number; then the 128-bit result R of LRW-AES encoding of data D can be expressed by the formula $R=(T \otimes n) \oplus AES((T \otimes n) \oplus D, M)$, where AES(b, k) denotes the encoding operation of the cipher AES for data block b and key k, $\otimes$ is multiplication in the Galois field $GF(2^{128})$ and $\oplus$ is addition in the same field (defined identically as bitwise XOR). This is depicted graphically in FIG. 1.

Decoding is a similar process. It can be expressed by the formula $D=(T \otimes n) \oplus AES^{-1}((T \otimes n) \oplus R, M)$, where $AES^{-1}(b, k)$ denotes the decoding operation of the cipher AES for the encoded data block b and key k.

Typically, thirty-two 128-bit data blocks used in the encoding/decoding process are grouped together to form 512-byte (i.e. 4096-bit) disk blocks, having sequential numbers n=32 m, 32 m+1, ..., 32 m+31, where m is the address of the disk's block.

There are two main methods for implementing such computations. The first one directly follows the structure shown in FIG. 1. It requires a very effective multiplication unit to be used thirty-two times for each block. To achieve good performance, the multiplication must be implemented in unrolled pipelined form. Therefore, it requires tens of thousands of gates.

Another approach is based on some pre-computations. Namely, one may pre-compute and store 128-bit values of the form $$T \otimes (2-1), T \otimes (4-1), T \otimes (8-1), \ldots, T \otimes (2^{128}-1) \quad (1)$$

Now one can sequentially find any series of products $P_n = T \otimes n$, where $n=n_0$, $n_0+1$, $n_0+2$ etc. using only one actual multiplication for $n=n_0$: each next value $P_{n+1}=T \otimes (n+1)$ can be expressed from the previous one $P_n=T \otimes n$ as:

$$\begin{aligned} P_{n+1} &= P_n \oplus (P_{n+1} \oplus P_n) \\ &= P_n \oplus (T \otimes (n+1) \oplus T \otimes n) \\ &= P_n \oplus (T \otimes ((n+1) \oplus n)), \end{aligned}$$

where $(n+1) \oplus n$ has the form $2^{m+1}-1$, with m equal to the number of trailing 1's in the binary expansion of n (or, m+1 is equal to the number of trailing 0's in the binary expansion of n+1). For example, $1 \oplus 0 = 1_2 \oplus 0_2 = 1_2 = 1 = 2^1 - 1$ (zero trailing 1's in $0=0_2$)

$2 \oplus 1 = 10_2 \oplus 1_2 = 11_2 = 3 = 2^2 - 1$ (one trailing 1's in $1=1_2$)

$3 \oplus 2 = 11_2 \oplus + 10_2 = 1_2 = 1 = 2^1 - 1$ (zero trailing 1's in $2=10_2$)

$4 \oplus 3 = 100_2 \oplus 11_2 = 111_2 = 7 = 2^3 - 1$ (two trailing 1's in $3=11_2$)

$5 \oplus 4 = 101_2 \oplus 100_2 = 1_2 = 1 = 2^1 - 1$ (zero trailing 1's in $4=100_2$)

$6 \oplus 5 = 110_2 \oplus 101_2 = 11_2 = 3 = 2^2 - 1$ (one trailing 1's in $5=101_2$)

$7 \oplus 6 = 111_2 \oplus 110_2 = 1_2 = 1 = 2^1 - 1$ (zero trailing 1's in $6=110_2$)

$8 \oplus 7 = 1000_2 \oplus 111_2 = 1111_2 = 15 = 2^4 - 1$ (three trailing 1's in $7=111_2$)

$9 \oplus 8 = 1001_2 \oplus 1000_2 = 1_2 = 1 = 2^1 - 1$ (zero trailing 1's in $8=1000_2$), etc.

Thus, the product $T \otimes ((n+1) \oplus n)$ is one of our stored pre-computed values, and it is sufficient just to add (XOR) it to $P_n$ to produce $P_{n+1}$. This method is efficient in terms of performance but requires a lot of memory.

The amount of required memory can be reduced if one may process 128-bit data blocks in a non-standard order. For example, usage of so-called Gray code (i.e. reordering number sequence in such a way that any two neighboring numbers have distinction in only one bit, like 0-1-3-2-6-7-5-4, i.e. binary 000-001-011-010-110-111-101-100) reduces the number of required pre-computed values from 128 to 7. But this kind of reordering may require changing the data transfer protocols, interfaces etc., or adding extra buffering, i.e. this method is not a universal solution.

Thus, additional implementations of the LRW-AES are needed, such as do not rely on expensive pipelined multipliers or extra random access memory, but still process data in natural order. While there are multiple existing implementations of LRW-AES, it is desirable to achieve a combination of compactness and maximum speed.

SUMMARY

The above and other needs are met by a combination of an infrequently-called tiny multiplication unit and a "differential" unit that quickly computes $T \otimes (n+1)$ based on known values of $T \otimes n$. The schedule (how often the multiplication unit is called) can be considered as a parameter of the algorithm. The proposed architecture of the "differential" unit is efficient both in terms of speed (delay) and area (gate count).

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

A method according to the present invention uses a special expansion instead of precomputed table of solutions to equation (1). The computation scheme is described in the steps below and generally depicted in FIG. 2. The computational efficiency of the scheme is based on the fact that the tweakable key T is preferably set once soon after power on and then is not changed, and taking into account the particular representation of the field $GF(2^{128})$ (generated by the polynomial $x^{128}+x^7+x^2+x+1$). In this regard, it is well to note that there exist two interpretations of binary representation of Galois Field elements. If for example, the element of GF(256) is binary encoded as "00100110," than we refer to it as number $38(0\times128+0\times64+1\times32+0\times16+0\times8+1\times4+1\times2+0\times1=38)$, but there exists a polynomial interpretation as $x^5+x^2+x$ (or, in more expanded form, $0\times x^7+0\times x^6+1\times x^5+0\times x^4+0\times x^3+1\times x^2+1\times x+0\times 1$).

The present method also makes use of the fact that 128-bit data blocks typically used in the encoding/decoding process are grouped together to form 512-byte disk blocks, having sequential numbers $n=32m, 32m+1, \ldots, 32m+31$, where m is the address of the disk's block, and the typical LRW-AES scenario includes infrequent positioning to random address locations, and then a long contiguous sequence of incrementing the addresses by one.

Thus, one can optimize the computation of $P_{n+1}=T\otimes(n+1)$ using the previously computed $P_n=T\otimes n$. The method according to the present invention is based on the following two expansions:

$$\begin{aligned} P_{n+1} &= P_n \oplus (P_{n+1} \oplus P_n) \\ &= P_n \oplus (T\otimes(n+1) \oplus T\otimes n) \\ &= P_n \oplus (T\otimes((n+1)\oplus n)) \end{aligned} \quad (2)$$

and $$\begin{aligned} T\otimes(2m-1) &= (T\oslash 3)\otimes(3\otimes(2^m-1)) \\ &= (T\oslash 3)\otimes(2^{m+1}+1) \\ &= (T\oslash 3)\otimes(2^{m+1}\oplus 1) \\ &= [(T\oslash 3)\otimes 2^{m+1}]\oplus(T\oslash 3), \end{aligned} \quad (3)$$

where $\oslash$ denotes division in the field $GF(2^{128})$, and $$\begin{aligned} m &= m(n) \\ &= 1 + (\text{number of trailing 1's in the binary expansion of } n) \\ &= (\text{number of trailing 0's in the binary expansion of } n+1). \end{aligned}$$

This definition of m(n) is selected such that $2^{(m(n))}-1)-1=(n+1)\oplus n$.

The scheme of computation of $T\otimes(2^{m(n)}-1)$, given inputs T and n, is described in the steps below and depicted in FIG. 2.

Step A. Pre-compute the 128-bit value:

$T_0=T\oslash 3$.

Figure 3:
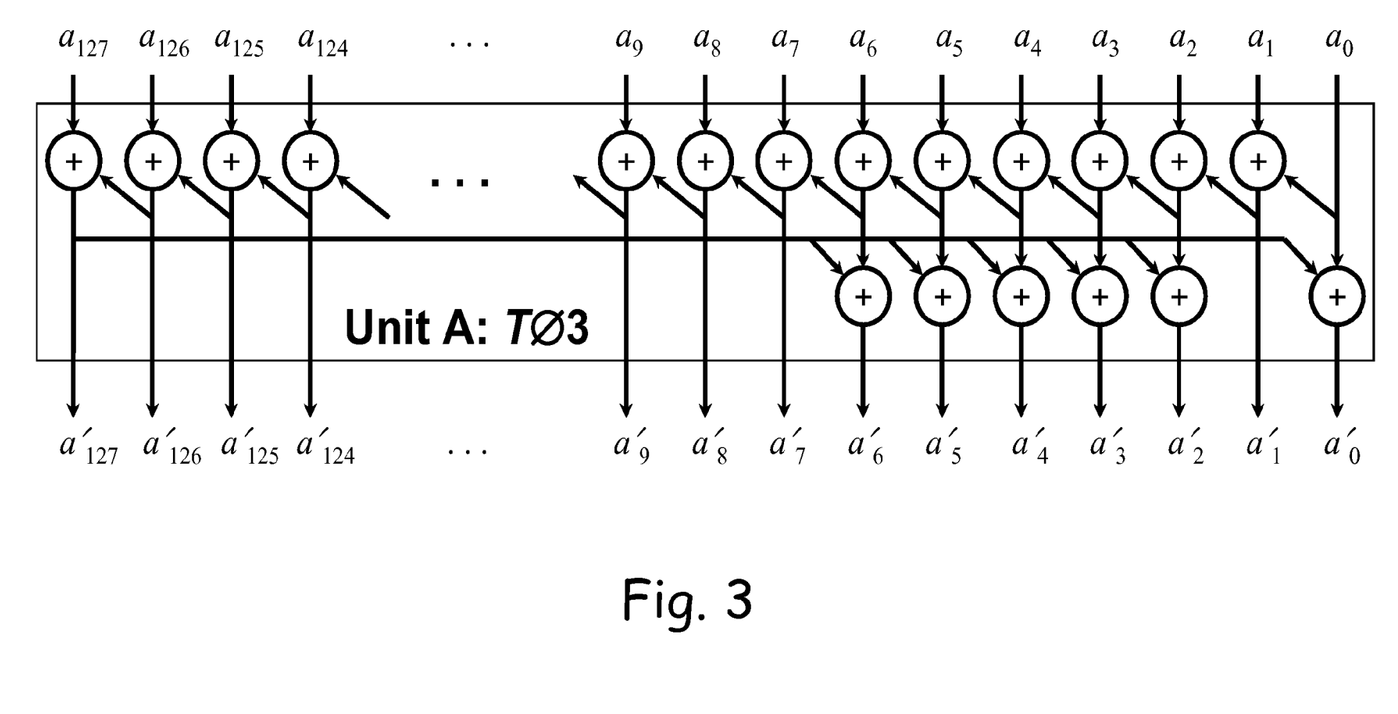
FIG. 3 depicts an embodiment of unit A as depicted in FIG. 2.

This can be done using just 133 XOR gates. FIG. 3 depicts one circuit structure for accomplishing this. Adding a few more gates, one can optimize the circuit for depth if desired, namely, the upper row of XORs as depicted can be reorganized into a tree-based structure with a depth as low as about seven XOR gates.

Step B. Pre-compute 128 128-bit values (each of which requires only three XORs):

$T_1=T_0\otimes 2$, $T_2=T_1\otimes 2$, $T_{128}=T_{127}\otimes 2$.

Note that these steps are written as if they were sequential, but the actual netlist behind them has a small depth. This depth also, if desired, can be reduced by reorganizing chains of XOR gates into trees.

Note also that $(T\oslash 3)\otimes(2^{m+1}\oplus 1)=T_{m+1}\oplus T_0$. That is, now we have to select the pre-computed value $T_{m+1}$ (depending on m). Steps C and D0-D6 perform this selection.

Step C. Starting with the 128-bit value n, compute the 7-bit value m. This is one of several frequently used operations and can be implemented with a delay of not more than seven levels of MUXes and a number of gates equal to approximately $2.5\times128$ ($0.5\times128$ MUXes and $2\times128$ simpler 2-input gates).

Figure 5:
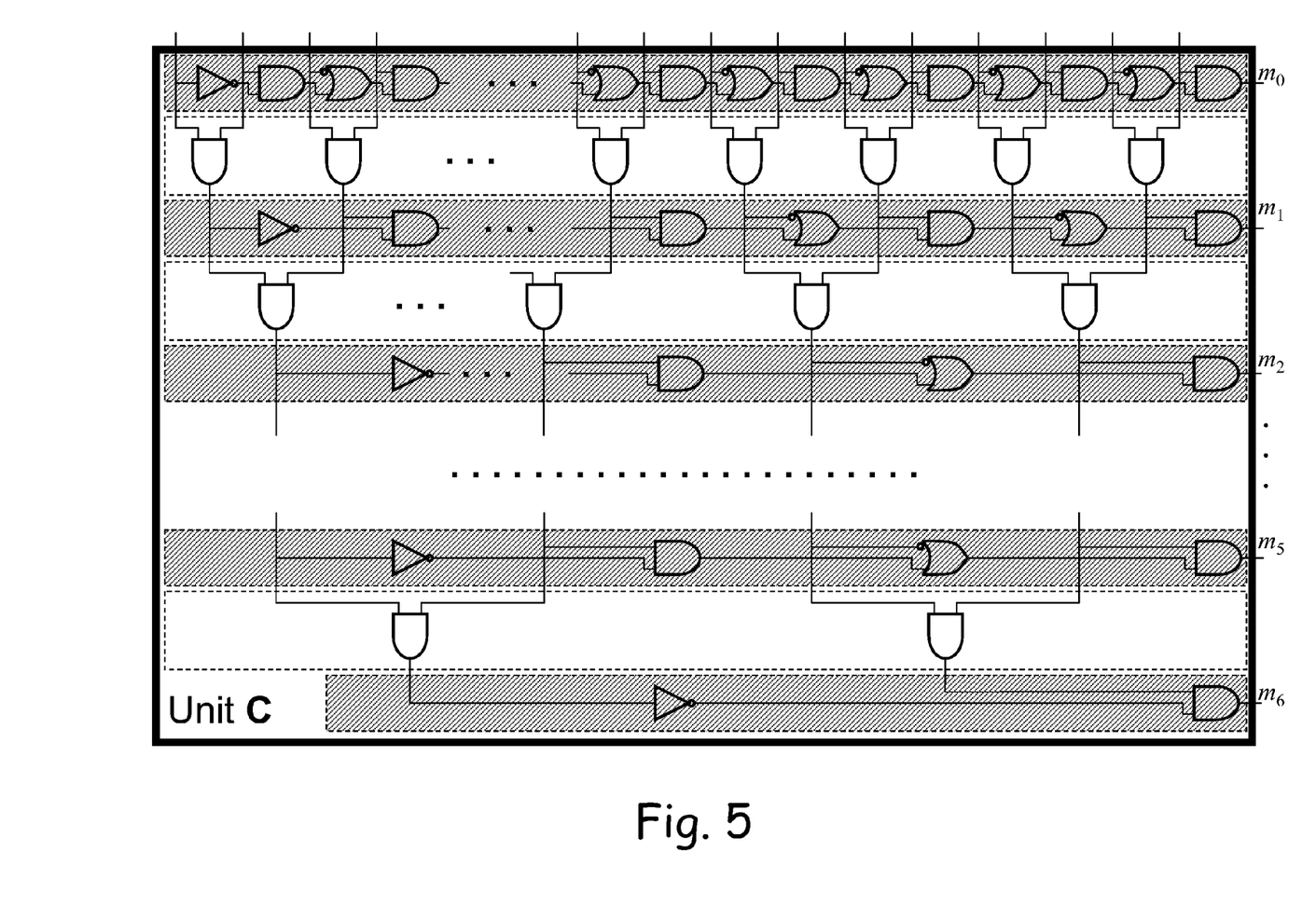
FIG. 5 depicts a representative embodiment of unit C as depicted in FIG. 2.

One embodiment of the circuitry to perform such a computation is depicted in FIG. 5. The embodiment of FIG. 5 is not a final solution for implementation, in that it has unacceptably high delay for such a time-critical module. It is just a sample circuitry with the same functional behavior. In the simple embodiment shown in FIG. 5, the hatched layers have a relatively large depth. However, these layers can be re-implemented. These layers correspond to functions of the form a&(b∨(c&(d∨(e& ... )))), and these functions for N inputs have circuits with depths of less than 2 log$_2$N, and a number of gates that is about 1.5N.

Step D0. Using the least significant bit $m_0$ in the binary expansion of m, compute sixty-four 128-bit values, by:

$T_{1,0}=m_0?T_1:T_2$, $T_{2,0}=m_0?T_3:T_4$, $T_{3,0}=m_0?T_5:T_6$, $T_{64,0}=m_0?T_{127}:T_{128}$.

(The C/C++-like notation of "a?b:c" means "if a, choose b; else choose c".)

Because each next $T_i$ is almost identical to the previous one cyclically shifted one position to the left, we may notice that instead of 64×128 MUXes, the calculation requires a much smaller number of them: 128 for the first result, but only five for each succeeding result, so the total number of MUXes is 128+5×63<3.5×128.

Step D1. Using the second least significant bit $m_1$ in the binary expansion of m, compute thirty-two more 128-bit values, by:

$T_{1,1}=m_1?T_{1,0}:T_{2,0}$, $T_{2,1}=m_1?T_{3,0}:T_{4,0}$, $T_{3,1}=m_1?T_{5,0}:T_{6,0}$, $T_{32,1}=m_1?T_{63,0}:T_{64,0}$.

Similar to that as described in the previous step, we can estimate the number of MUXes here as 128+9×31<3.25×128.

Step D2. Using the third least significant bit $m_2$ in the binary expansion of m, compute sixteen more 128-bit values, by:

$T_{1,2}=m_2?T_{1,1}:T_{2,1}$, $T_{2,2}=m_2?T_{3,1}:T_{4,1}$, $T_{3,2}=m_2?T_{5,1}:T_{6,1}$, $T_{16,2}=m_2?T_{31,1}:T_{32,1}$.

Similarly to that as described in the previous steps, we can estimate the number of MUXes here as 128+14×15<2.75×128.

Steps D3, D4, D5 are for further computations to reduce the number of values to eight, then four, then two 128-bit values, similar to that as described above in steps D0 through D2 using bits $m_3$, $m_4$, and $m_5$, respectively. Finally, Step D6 computes a single 128-bit value, by:

$T_{1,6}=m_6?T_{1,5}:T_{2,5}$

The number of MUXes used in steps D3 through D6 can be estimated as (128+22×7)+(128+38×3)+(128+70×1)+128<7×128, which makes a total of 16.5×128 MUXes for all of the steps D0 through D6. Note that $T_{1,6}$ is the same as our desired $T_{m+1}$. That is, we have to perform the very last step.

Step E. Compute:

$T_{m+1} \oplus T_0$.

This step requires just 128 XOR gates.

The timing-critical part of the entire computation (i.e. steps C through D0 ... D6 through E, because the tweakable key T can be considered as a constant) is very small: about fifteen levels of MUXes, or one to two clock cycles for a typical implementation. The number of gates is also moderate: about 3,000 XORs and MUXes (not including control logic, registers to store the tweakable key T and the last value of P, and the "slow" multiplication module used in the beginning of each 512-byte block).

Figure 7:
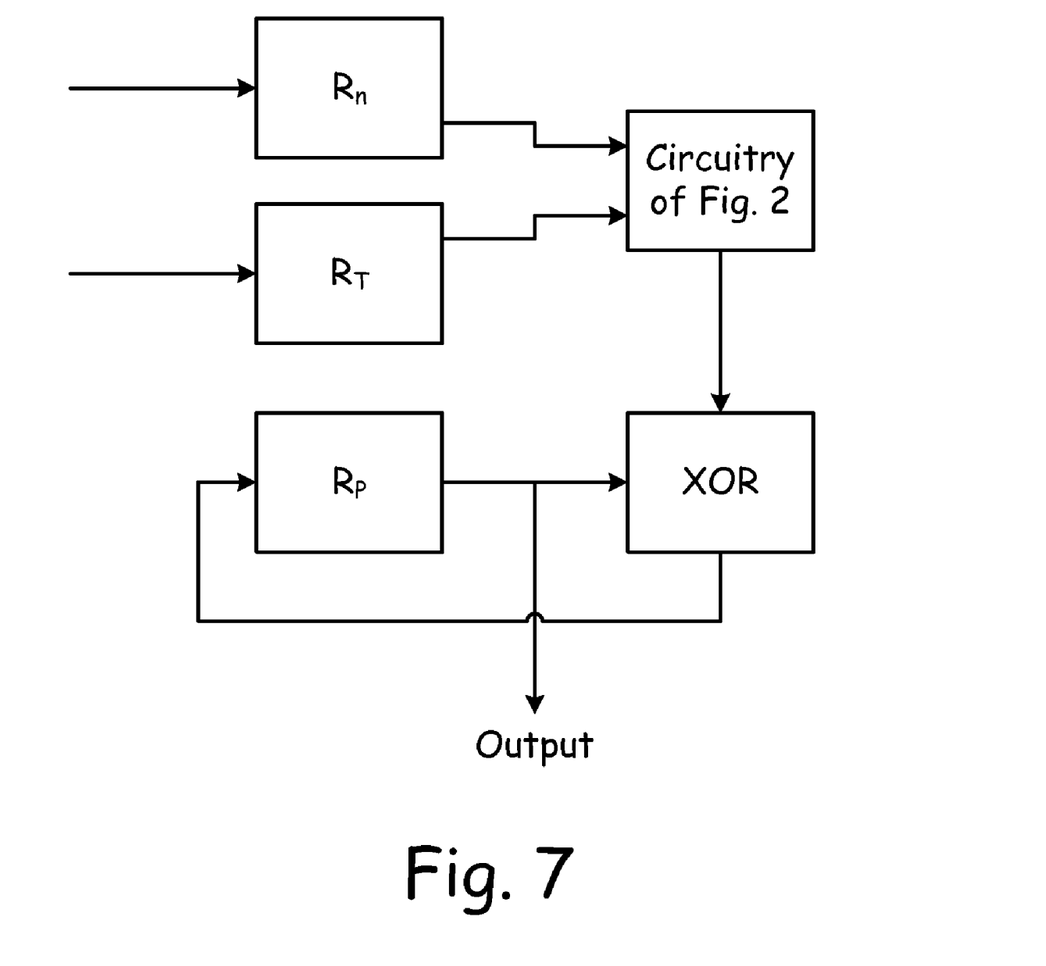
FIG. 7 depicts an additional embodiment including the circuitry of FIG. 2.

The output of unit E is used to compute $P_{n+1}$ given n, T, and $P_n$. These three values are stored somewhere, such as in registers $R_n$, $R_T$, and $R_P$, and the circuit in FIG. 2, with 128 extra XOR gates, computes a new value to be downloaded back into $R_P$, as depicted in FIG. 7.

Figure 2:
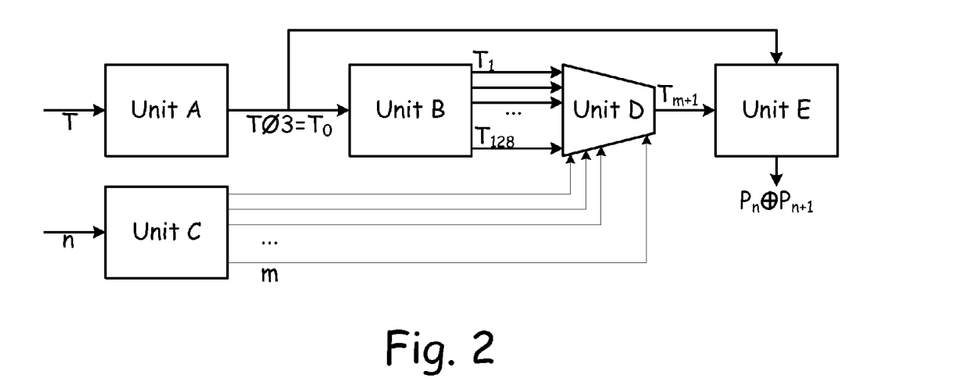
FIG. 2 depicts a logical structure of a computational scheme according to the present invention, where all connections in the figure except those between units C and D represent 128-bit busses.
Figure 4:
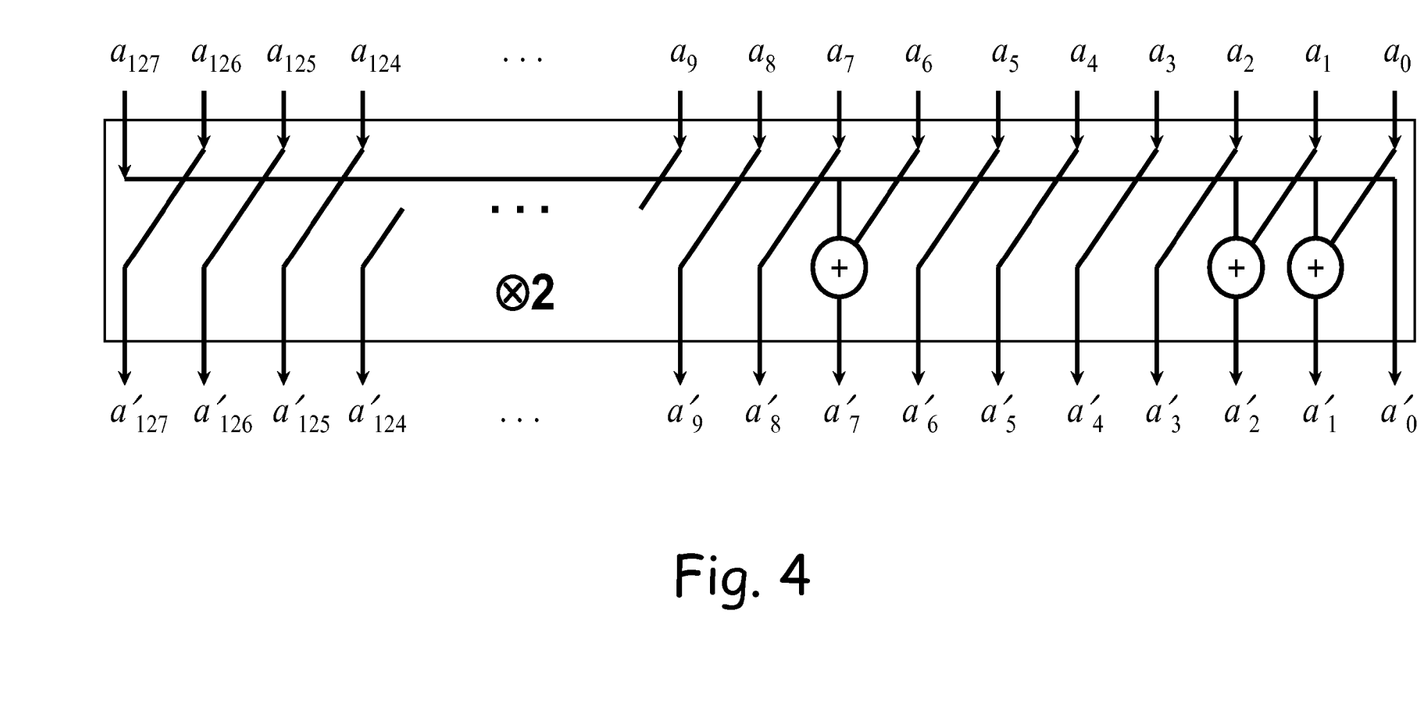
FIG. 4 depicts an embodiment of an internal sub-module "$\otimes 2$" to be used in unit B, depicted in FIG. 2.
Figure 6:
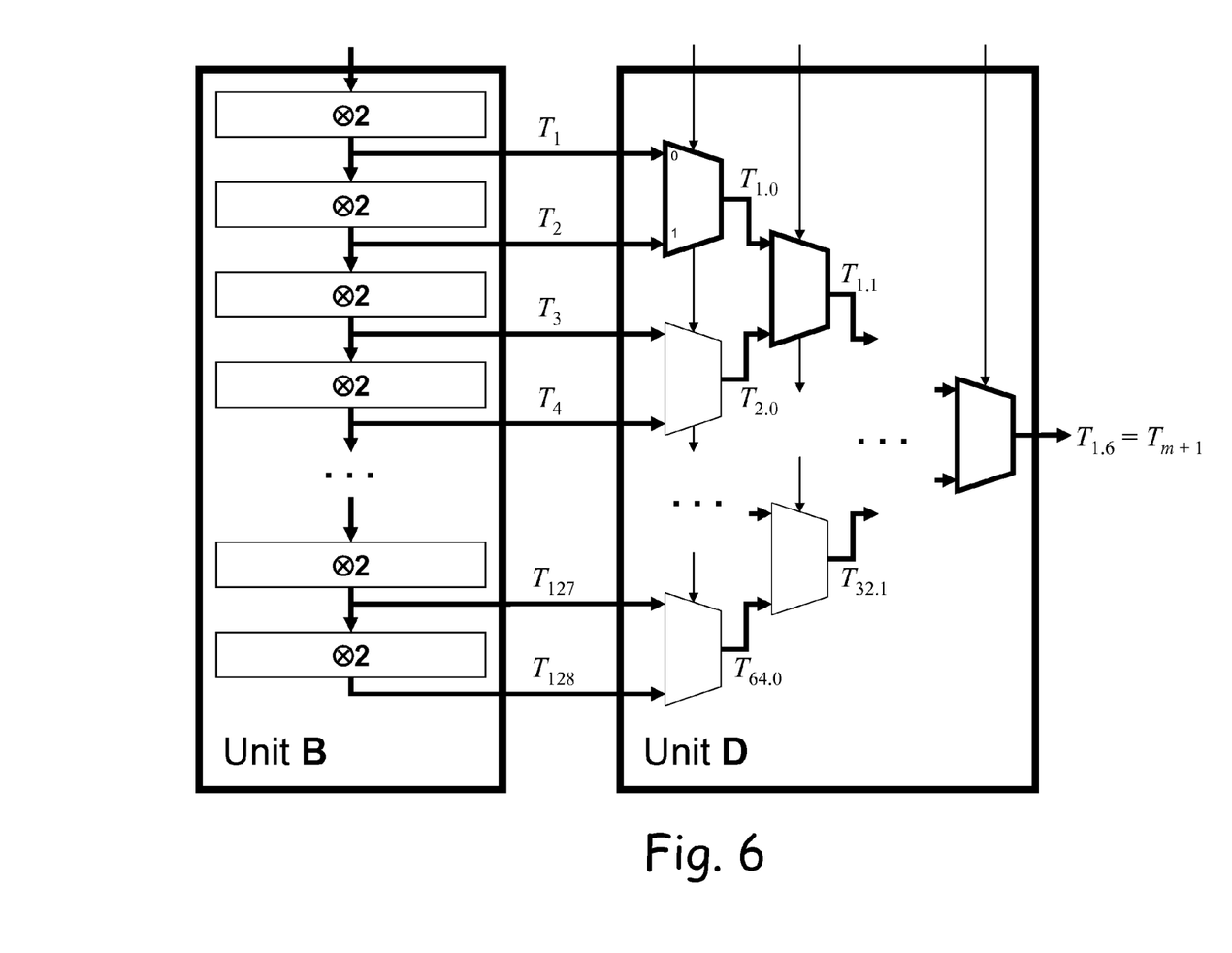
FIG. 6 depicts an embodiment of units B and D as depicted in FIG. 2.

The circuitry of FIG. 2 is used to transform a data block D in the following manner. Formally, the block D has 128×128 inputs. But actually, each next 128-bit group of inputs has only three new values, and the remaining 125 are just copies from the previous one, shifted one position to the left (see FIG. 4). For example, if the first, second, third, and fourth 128-bit group of inputs ($T_1$ ... $T_4$ in FIGS. 2 and 6) are, respectively:

a[127]a[126] ... a[0]

b[127]b[126] ... b[0]

c[127]c[126] ... c[0]

d[127]d[126] ... d[0]

then $b[i]=a[i-1 \mod 128]$(excepting $i$=1,2,7);

$c[i]=b[i-1 \mod 128]$(excepting $i$=1,2,7);

$d[i]=c[i-1 \mod 128]$(excepting $i$=1,2,7).

Then, the top-left MUX in Unit D (see FIG. 6) selects between a and b:

$x[i]$=if($m_0$) then $b[i]$ else $a[i]$ the MUX just under it selects between c and d:

$y[i]$=if($m_0$) then $d[i]$ else $c[i]$.

Due to relationships between a, b, c, and d, most of y[i] are the same as x[i−2 mod 128]:

y[0]=x[126]

y[1] has a new value y[2] has a new value y[3] has a new value y[4]=x[2]

y[5]=x[3]

y[6]=x[4]

y[7] has a new value y[8] has a new value y[9]=x[7]

y[10]=x[8]

y[127]=x[125]

In other words, the computation of all 128 y[i] values actually requires only five gates. This is why the second MUX (the one that produces $T_{2,0}$ in FIG. 6) is displayed with a lighter weight outline—it (and the other MUXs with lighter line weight) can be considered to be a "lighter weight" MUX. In the same way, all the other MUXes behave similarly: for each column, only the first MUX contains all 128 elementary one bit MUXes, whereas all MUXes below it are much simpler. The estimation shows that the whole set of MUXes for N×N inputs (in our case, N=128) contains not about N×N gates (as would happen if all N×N inputs are distinct), but only about const×N, where const is a moderate constant that is less than N.

Further Improvements

By adding a few gates, we can improve the timing in the computation. For example, we can use the fact that, if n is even, then the value of $T \otimes ((n+1) \oplus n)$ is just T; thus for even n's we can produce the result immediately and start to prepare the computation for n+1, i.e. we get one extra clock cycle for free, as depicted in FIGS. 8-9.

Figure 8:
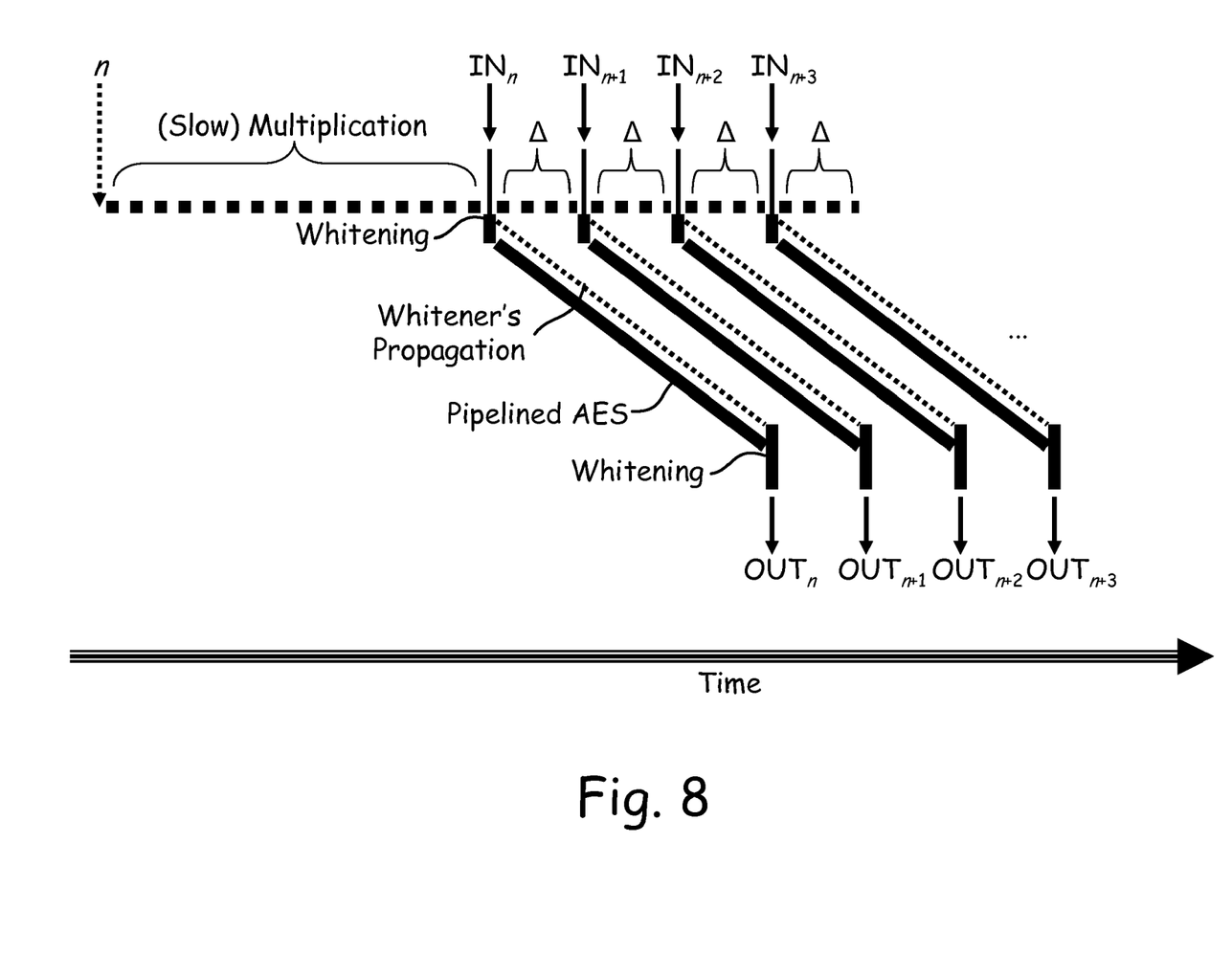
FIG. 8 depicts a sample timed data flow diagram of computations according to one embodiment of the present invention (for the extreme case when actual multiplication is executed only once in the very beginning of the data sequence), as depicted in FIG. 2.
Figure 9:
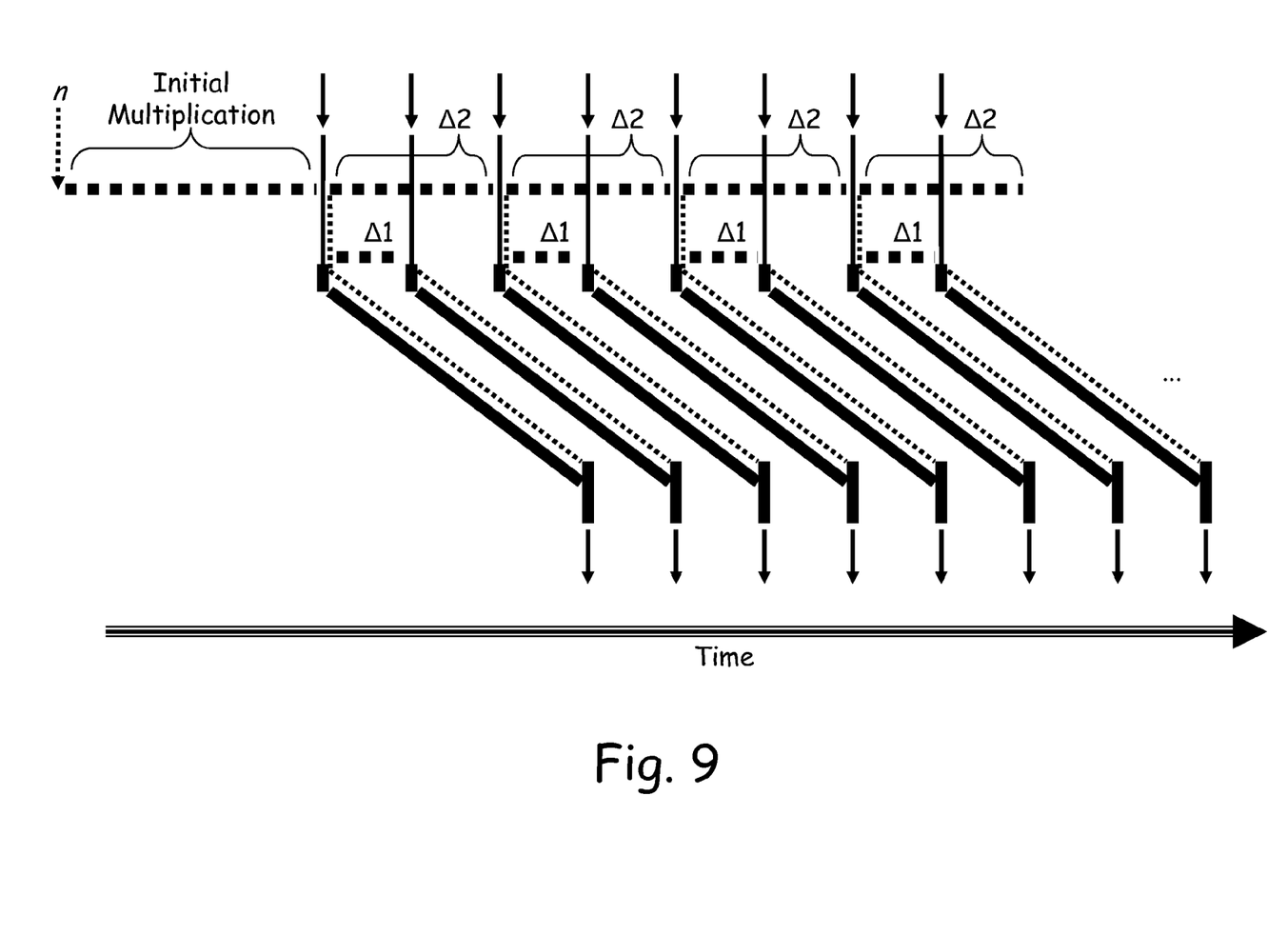
FIG. 9 depicts a sample timed data flow diagram of computations according to another embodiment of the present invention (for the case when actual multiplication is executed for each second portion of input data), as depicted in FIG. 2.
Figure 10:
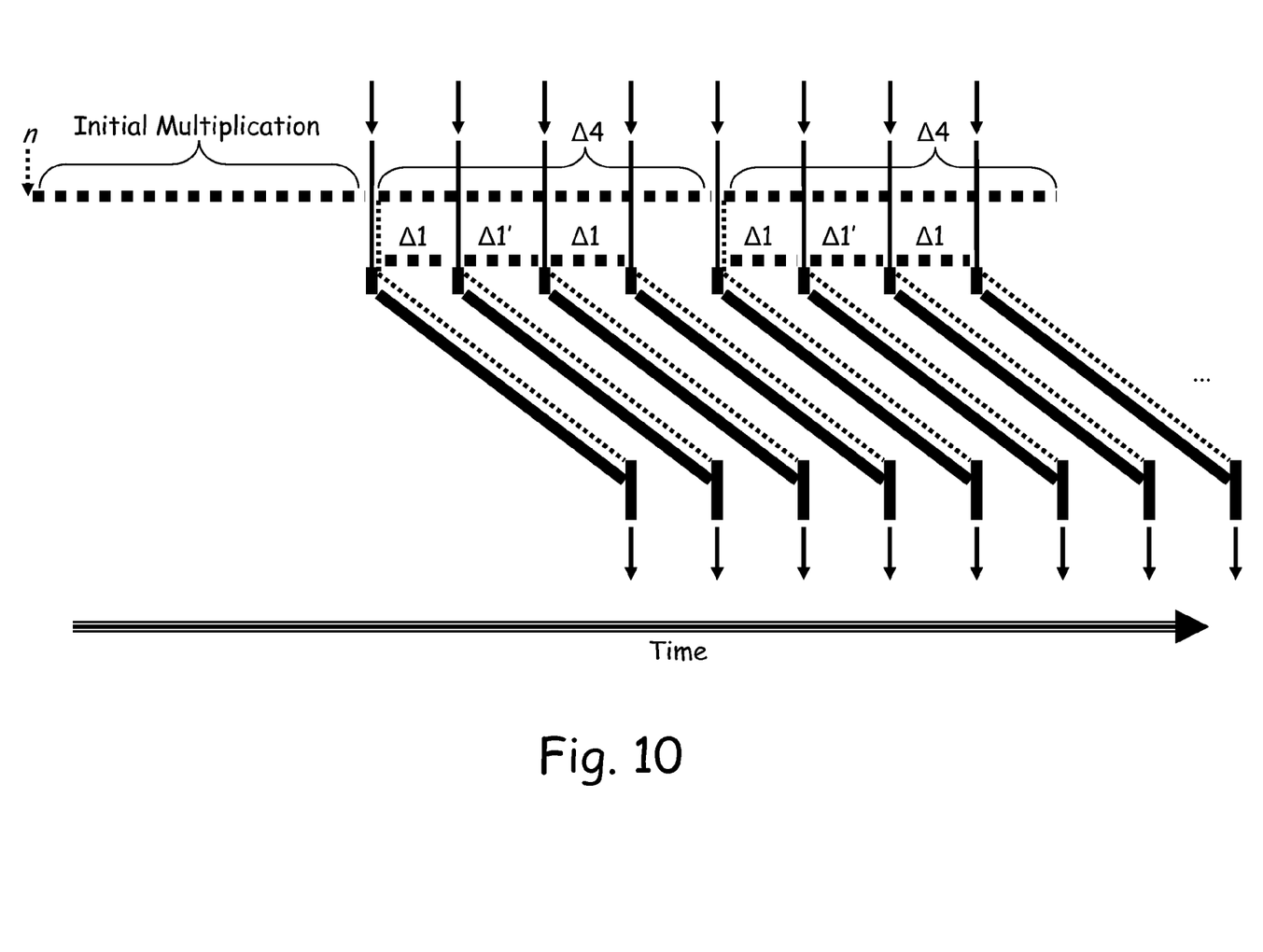
FIG. 10 depicts a sample timed data flow diagram of computations according to yet another embodiment of the present invention (for the case when actual multiplication is executed for each fourth portion of input data), as depicted in FIG. 2.

In FIGS. 8-10, dotted lines represent propagation and modification of auxiliary information (address (index) and whitening vector), solid lines represent actual data under transformation, and thick lines, whether solid or dotted, represent computations.

In FIG. 8, transformations marked "Δ" require one clock cycle, and include computing the differential $D_T(n)=T \otimes ((n+1) \oplus n)$, updating the whitening vector $P_{n+1}=P_n \oplus D_T(n)$, and updating the index n=n+1.

In FIG. 9, the transformations "Δ1" and "Δ2" may be applied only to even values of n. "Δ2" is similar to "Δ" in FIG. 8 with n+2 instead of n+1, but can use two clock cycles instead of one. The transformation of "Δ1" (identical to "Δ" in FIG. 8) must be fast (one clock cycle long), but due to the fact that n is even, the principal part of the computation, $D_T(n)=\otimes((n+1) \oplus n)$, actually means that $D_T(n)=T$.

Alternately, we can separately find values $T \otimes ((n+1) \oplus n)$ for n=0, 1, 2 (mod 4): they are just T, $T \otimes 3$, T respectively; and only the computation for n=3 (mod 4) requires a general procedure. That is, starting with n=0 (mod 4) we can initiate the computing for n+3, that gives us three extra clock cycles for free, as depicted in FIG. 10. The further generalization is also clear and may be useful. In FIG. 10, n may be chosen of the form 4k. The transformation "Δ4" is similar to "Δ" in FIG. 8, with n+4 instead of n+1, but can use four clock cycles instead of one. The transformation "Δ1" is the same as in FIG. 9. The transformation Δ1' is another one-clock cycle variant of "Δ" in FIG. 8, but applied to n of the form 4k+1. Due to this fact, in the transformation Δ1' the computation of $D_T(n)=T \otimes ((n+1) \oplus n)$ is reduced to a quite simple $D_T(n)=T \otimes 3$.

In a similar way, as a generalization of the two methods described above, we can separately find values $T \otimes ((n+1) \oplus n)$ for n=0, 1, ..., K-2 (mod K), where K=$2^k$, and only the computation for n=K-1 (mod K) requires a general procedure. Among the first K-1 values there are only k different ones, namely, $T=T \otimes (2-1)$, $T \otimes 3=T \otimes (4-1)$, $T \otimes 7=T \otimes (8-1)$, ..., $T \otimes (K-1)$.

Note that the four-clock cycle computation "Δ4" in FIG. 10 (or a similar block "ΔK" in the general case) may now be implemented not only in a differential way, but also using direct multiplication of the form $P_n=T \otimes n$, possibly sharing the same multiplication unit as the one used for the initial multiplication.

It may also be efficient in certain situations to use two copies of some or all of these units: the first one computes values to be XORed with the input data prior to the input of the AES, and the second one repeats the calculation, after some delay that depends on the AES implementation (ten to twenty clock cycles, for example), with the output of this second block to be XORed with the output of the AES. This might supersede one set of computation blocks, whose outputs are stored in some memory or passed through the pipeline just to make synchronization with the output of the AES.

CONCLUSION

The above describes a novel method of encrypting data, where an appropriate differential value $D=T \otimes ((n+1) \oplus n)$ is calculated on the fly as encryption is performed. This either reduces the memory or the computational capacity (or both) that is required by other methods. The method is accomplished in the following five steps:

Step A Pre-compute the 128-bit value $T_0$ (which can be done using just 130-150 XOR gates);

Step B Pre-compute 128 128-bit values (each of them requires only three XORs):

$T_1=T_0 \otimes 2, T_2=T_1 \otimes 2, \ldots, T_{128}=T_{127} \otimes 2.$

Step C The value m is computed as the number of trailing ones in the binary expansion of n.

Step D Perform the selection of value $T_{m+1}$ (depending on m). Due to small and regular differences (depending on irreducible polynomial generating Galois field), this selection can be done with a great reduction in the number of MUXes.

Step E Compute the differential $D=T_{m+1} \oplus T_0$.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of computing whitening vectors, the method comprising:

(A) entering a tweakable 128-bit key T to a first functional unit to produce a 128-bit $T_0$ value, where $T_0=T \varnothing 3,$ (B) entering To into a second functional unit to produce 128 128-bit values $T_1$-$T_{128}$, where, $T_1=T_0 \otimes 2,$ $T_2=T_1 \otimes 2,$ $T_{128}=T_{127} \otimes 2,$ (C) entering a 128-bit address value n into a third functional unit to produce 7-bit m values, where m represents a count of trailing values of one in a binary expansion of the address value n, (D) using the address value n, reduce the values $T_{1-128}$ in a fourth functional unit to produce one 128-bit value $T_{m+1}$, by:

(i) using the least significant bit $m_0$ of m, compute sixty-four 128-bit values, by:

$T_{1.0}=m_0?T_1:T_2$, $T_{2.0}=m_0?T_3:T_4$, $T_{3.0}=m_0?T_5:T_6$, $T_{64.0}=m_0?T_{127}:T_{128}$, (ii) using the second least significant bit $m_1$ of m, compute thirty-two 128-bit values, by:

$T_{1.1}=m_1?T_{1.0}:T_{2.0}$, $T_{2.1}=m_1?T_{3.0}:T_{4.0}$, $T_{3.1}=m_1?T_{5.0}:T_{6.0}$, $T_{32.1}=m_1?T_{63.0}:T_{64.0}$, (iii) using the third least significant bit $m_2$ of m, compute sixteen 128-bit values, by:

$T_{1.2}=m_2?T_{1.1}:T_{2.1}$, $T_{2.2}=m_2?T_{3.1}:T_{4.1}$, $T_{3.2}=m_2?T_{5.1}:T_{6.1}$, $T_{16.2}=m_2?T_{31.1}:T_{32.1}$, (iv) using the fourth least significant bit $m_3$ of m, compute eight 128-bit values in the same manner as described in steps (D)(i) through (D)(iii), (v) using the fifth least significant bit $m_4$ of m, compute four 128-bit values in the same manner as described in steps (D)(i) through (D)(iii), (vi) using the sixth least significant bit $m_5$ of m, compute two 128-bit values in the same manner as described in steps (D)(i) through (D)(iii), and (vii) using the seventh least significant bit $m_6$ of m, compute the 128-bit value $T_{m+1}$ in the same manner as described in steps (D)(i) through (D)(iii), (E) input $T_{m+1}$ and $T_0$ into a fifth functional unit to compute differential $D_T(n)=T_{m+1} \oplus T_0$, and (F) using the differential $D_T(n)$, compute whitening vector $P_{n+1}=P_n \oplus D_T(n+1)$ and use $P_{n+1}$ to encrypt/decrypt a data block for storage, where $P_{n0}$ has been computed in an external multiplication unit once, at a beginning of a series of sequentially indexed data blocks.

2. The method of claim 1, further comprising:
computing the whitening vector for each n,
XORing the whitening vector with an input block of data,
sending the XORed input block of data through an AES unit to produce an output block of data, and
XORing the output block of data with the whitening vector.

3. The method of claim 1, further comprising:
computing the differentials using separate first and second processes that function identically and with a time shift between the two processes that is equal to a latency of the AES unit,
where when the first process produces the whitening vector $P_t$ at moment t, the AES unit finishes processing the t-th data block at t+latency(AES), and the second process has the whitening vector $P_t$ ready at t+latency(AES).

4. The method of claim 1, wherein calculations are performed only for values of n that are divisible by two, as:

$D1(n)=T$, $D2(n)=D_T(n/2) \otimes 2=D_{T \otimes 2}(n/2)$, $P_{n+1}=P_n \oplus D1(n)$, and $P_{n+2}=P_n \oplus D2(n)$ 5. The method of claim 4, further comprising:
computing the whitening vector for each n,
XORing the whitening vector with an input block of data,
sending the XORed input block of data through an AES unit to produce an output block of data, and
XORing the output block of data with the whitening vector.

6. The method of claim 5, further comprising:
computing the differentials using separate first and second processes that function identically and with a time shift between the two processes that is equal to a latency of the AES unit,
where when the first process produces the whitening vector $P_t$ at moment t, the AES unit finishes processing the t-th data block at t+latency(AES), and the second process has the whitening vector $P_t$ ready at t+latency(AES).

7. The method of claim 1, wherein calculations are performed only for values of n that are divisible by four, as:

$D1(n)=D1(n+2)=T$, $D1'(n+1)=T \otimes 3$, $D4(n)=D_T(n/4) \otimes 4=D_{T \otimes 4}(n/4)$, $P_{+1}=P_n \oplus D1(n)$, $P_{n+2}=P_{n+1} \oplus D1'(n+1)$, $P_{n+3}=P_{n+2} \oplus D1(n+2)$, and $P_{n+4}=P_n \oplus D4(n)$ 8. The method of claim 7, further comprising:
computing the whitening vector for each n,
XORing the whitening vector with an input block of data,
sending the XORed input block of data through an AES unit to produce an output block of data, and
XORing the output block of data with the whitening vector.

9. The method of claim 8, further comprising:
computing the differentials using separate first and second processes that function identically and with a time shift between the two processes that is equal to a latency of the AES unit,
where when the first process produces the whitening vector $P_t$ at moment t, the AES unit finishes processing the t-th data block at t+latency(AES), and the second process has the whitening vector $P_t$ ready at t+latency(AES).

10. The method of claim 1, wherein calculations are performed only for values of n that are divisible by $K=2^k$, where $k>0$, as:

for $0<i<K$, $P_{n+i}=P_{n+i-1}\oplus +D1(n+i-1)$, and $P_{n+K}=P_n \oplus DK(n)$, where $DK(n)=D_T(n/K)\otimes K = D_{T\otimes K}(n/K)$.

11. The method of claim 10, further comprising:
computing the whitening vector for each n,
XORing the whitening vector with an input block of data,
sending the XORed input block of data through an AES unit to produce an output block of data, and
XORing the output block of data with the whitening vector.

12. The method of claim 11, further comprising:
computing the differentials using separate first and second processes that function identically and with a time shift between the two processes that is equal to a latency of the AES unit,
where when the first process produces the whitening vector $P_t$ at moment t, the AES unit finishes processing the t-th data block at t+latency(AES), and the second process has the whitening vector $P_t$ ready at t+latency(AES).

13. The method of claim 1, wherein calculations are performed only for values of n that are divisible by $K=2^k$, where $k>0$, as:

for $0<i<K$, $P_{n+i}=P_{n+i-1}\oplus D1(n+i-1)$, and $P_{n+K}=T\otimes(n+K)$.

14. The method of claim 13, further comprising:
computing the whitening vector for each n,
XORing the whitening vector with an input block of data,
sending the XORed input block of data through an AES unit to produce an output block of data, and
XORing the output block of data with the whitening vector.

15. The method of claim 14, further comprising:
computing the differentials using separate first and second processes that function identically and with a time shift between the two processes that is equal to a latency of the AES unit,
where when the first process produces the whitening vector $P_t$ at moment t, the AES unit finishes processing the t-th data block at t+latency(AES), and the second process has the whitening vector $P_t$ ready at t+latency(AES).

* * * * *